United States Patent
Takagi et al.

(10) Patent No.: US 7,546,620 B2
(45) Date of Patent: Jun. 9, 2009

(54) CHANNEL SELECTION DEVICE FOR USE IN DIGITAL/ANALOG BROADCASTING RECEIVER AND DIGITAL/ANALOG BROADCASTING RECEIVER EQUIPPED WITH THE SAME

(75) Inventors: Toshihiro Takagi, Takatsuki (JP); Manabu Yamamoto, Mukou (JP); Yasuhiro Inui, Yao (JP); Yusuke Nishida, Ikoma (JP)

(73) Assignee: Funai Electric Co., Ltd., Daito-shi (JP)

( * ) Notice: Subject to any disclaimer, the term of this patent is extended or adjusted under 35 U.S.C. 154(b) by 1083 days.

(21) Appl. No.: 10/059,031

(22) Filed: Jan. 30, 2002

(65) Prior Publication Data
US 2002/0104085 A1 Aug. 1, 2002

(30) Foreign Application Priority Data
Jan. 31, 2001 (JP) ............................. 2001-024503

(51) Int. Cl.
G06F 3/00 (2006.01)
G06F 13/00 (2006.01)
H04N 5/445 (2006.01)
H04N 5/50 (2006.01)
H04N 7/16 (2006.01)

(52) U.S. Cl. .................. 725/38; 348/732; 348/731; 348/570; 725/56; 725/151

(58) Field of Classification Search ............. 725/38, 725/56–57
See application file for complete search history.

(56) References Cited

U.S. PATENT DOCUMENTS

| 5,410,326 A | 4/1995 | Goldstein |
| 5,461,427 A | 10/1995 | Duffield et al. |
| 5,982,411 A | 11/1999 | Eyer et al. |
| 6,084,643 A | 7/2000 | Kishtaka et al. |
| 6,084,645 A * | 7/2000 | Park et al. ............ 348/734 |
| 6,104,436 A | 8/2000 | Lee |
| 6,137,539 A * | 10/2000 | Lownes et al. ........ 348/569 |
| 6,215,530 B1 | 4/2001 | Wasilewski |
| 6,249,320 B1 * | 6/2001 | Schneidewend et al. ... 348/569 |
| 6,313,886 B1 | 11/2001 | Sugiyama |

(Continued)

FOREIGN PATENT DOCUMENTS

JP 55-026760 2/1980

(Continued)

*Primary Examiner*—Christopher Kelley
*Assistant Examiner*—Usha Raman
(74) *Attorney, Agent, or Firm*—Crowell & Moring LLP

(57) ABSTRACT

A channel selection device of the invention used in a digital/analog broadcasting receiver, upon reception of a channel changing instruction sent from input device, tries to select a desired channel by referencing its VCT if it can find channel information in a memory and, if it could not find the desired channel and failed in channel selection, obtains the latest VCT to thereby select such a channel in the VCT that has the smallest sub-channel number in the same main channel or select such a channel that has the smallest sub-channel number in the same physical channel. Thus, if a channel specified in the channel changing instruction sent from the user has no broadcast therethrough and failed to be selected, an appropriate channel is selected automatically, thus avoiding a state that nothing is displayed on the display.

2 Claims, 4 Drawing Sheets

U.S. PATENT DOCUMENTS

| | | |
|---|---|---|
| 6,367,078 B1 | 4/2002 | Lasky |
| 6,396,523 B1 | 5/2002 | Segal et al. |
| 6,483,547 B1 * | 11/2002 | Eyer .......................... 348/473 |
| 6,490,001 B1 | 12/2002 | Shintani et al. |
| 6,564,378 B1 | 5/2003 | Satterfield et al. |
| 6,598,233 B1 | 7/2003 | Choi |
| 6,621,528 B1 | 9/2003 | Kessler et al. |
| 6,661,472 B2 | 12/2003 | Shintani et al. |
| 6,707,508 B1 * | 3/2004 | Mears et al. ................. 348/731 |
| 6,714,264 B1 | 3/2004 | Kempisty |
| 6,731,345 B2 | 5/2004 | Lee |
| 6,766,526 B1 | 7/2004 | Ellis |
| 6,775,843 B1 * | 8/2004 | McDermott ................. 725/151 |
| 6,817,027 B1 | 11/2004 | Curreri |
| 6,825,874 B1 | 11/2004 | Tripathy |
| 6,836,296 B1 | 12/2004 | Terakado et al. |
| 7,050,117 B2 | 5/2006 | Takagi et al. |
| 7,092,044 B2 * | 8/2006 | Inui et al. ................... 348/732 |
| 2001/0052124 A1 * | 12/2001 | Kim et al. ..................... 725/39 |
| 2002/0089603 A1 | 7/2002 | Onomatsu |
| 2002/0097164 A1 | 7/2002 | Takagi et al. |
| 2002/0101540 A1 | 8/2002 | Takagi et al. |
| 2002/0104102 A1 | 8/2002 | Takagi et al. |
| 2002/0104103 A1 | 8/2002 | Takagi et al. |
| 2002/0113895 A1 | 8/2002 | Takagi et al. |
| 2002/0171775 A1 | 11/2002 | Okabe |
| 2004/0133910 A1 | 7/2004 | Gordon et al. |
| 2004/0172661 A1 | 9/2004 | Yagawa et al. |
| 2005/0005307 A1 * | 1/2005 | Kim .......................... 725/131 |
| 2005/0163148 A1 * | 7/2005 | Kim et al. ................... 370/437 |

FOREIGN PATENT DOCUMENTS

| | | |
|---|---|---|
| JP | 04-227379 | 8/1992 |
| JP | 11-164214 | 6/1999 |
| JP | 11-275476 | 10/1999 |
| JP | 2000-165766 | 6/2000 |

* cited by examiner

| CHANNEL | | | | |
|---|---|---|---|---|
| 1-1 | 2-1 | 3-1 | 4-0 | 5-1 |
| 1-2 | 2-0 | 3-2 | | 5-2 |
| 1-3 | | 3-3 | | 5-0 |
| 1-0 | | 3-4 | | |
| | | 3-5 | | |
| | | 3-0 | | |

CHANNEL SELECTION DEVICE FOR USE IN DIGITAL/ANALOG BROADCASTING RECEIVER AND DIGITAL/ANALOG BROADCASTING RECEIVER EQUIPPED WITH THE SAME

BACKGROUND OF THE INVENTION

This invention relates to a channel selection device used in a television receiver for receiving a digital/analog broadcast and a digital/analog broadcasting receiver equipped with the same.

There has conventionally been available such a digital/analog broadcasting receiver that is capable of selecting a channel to display a list of channel information obtained by analyzing a broadcasting signal in order to facilitate channel selecting operations (see, for example, Japanese Unexamined Patent Publication No. 55-26760). There is also available such a receiver that automatically switches to such a channel that is capable of higher quality reception if the reception quality deteriorated (see, for example, Japanese Unexamined Patent Publication No. 2000-165766).

By the ATSC (Advanced Television Systems Committee) Standard of the North America Digital Broadcasting, besides a prior art analog broadcast, there are originated a BS (Broadcasting Satellite) digital broadcast capable of high-picture-quality and multi-channel broadcasting and a digital broadcast represented by the CS (Communications Satellite) digital broadcast, each of which digital broadcasts is originated in a carrier wave in a predetermined frequency band through a physical channel different from that for analog broadcasting, thus generally containing many contents. Other digital broadcasts originated from the same broadcasting station or the same system of broadcasting station as the prior art analog broadcasting station are managed so that the station can be selected and displayed through a virtual channel assigned the same channel numbers as the prior art analog broadcasting channel numbers in order to facilitate the operations of the users accustomed to these prior art channel numbers.

The digital broadcasting virtual channels comprise one main channel and sub-channels which are headed by the main channel number to originate one or a plurality of contents, which channels are given in a hierarchy. The configuration of the sub-channels changes with a broadcasting time band, one of which is exemplified in FIG. 5 which shows a configuration of the sub-channels in a time band (8:00 PM to 12:00 PM) that has a main channel "4".

In FIG. 5, in broadcasting, sub-channels of Nos. 0 to 4 are selected for 8:00 to 9:00 PM, sub-channels of Nos. 0 and 1 are selected for 9:00 to 10:00 PM, sub-channels of Nos. 0 to 4 are selected for 10:00 to 11:00 PM, and sub-channels of Nos. 0 to 3 are selected for 11:00 to 12:00 PM. Among these, the sub-channel of No. 0 (physical channel No. of 4-0) involves analog broadcasting according to the NTSC (National Television Systems Committee) Standard, while the sub-channels of Nos. 1 to 4 (virtual channels Nos. 4-1 through 4-4) involve digital broadcasting. Also, a TV program broadcast through the channel 4-0 is a prior art analog-broadcast one, an SD (Standard Definition) program broadcast through the channels 4-1 through 4-4 are digital broadcast standard-picture-quality one, and an HD (High Definition) program broadcast through the channel 4-1 is a digital broadcast high-picture-quality one.

There is such a prior art digital/analog broadcasting receiver's channel selection device that decodes and analyzes a broadcasting signal to obtain a VCT (Virtual Channel Table) containing virtual channel information based on PSIP (Program System Information protocol) and hold a channel map storing this table, so that when the user changes or select a channel, based on this channel map, an EPG (Electric Program Guide) functioning as an interface is used to display a channel selection display to thereby operate the key (e.g., UP key/DOWN key) at the body's operation panel or remote-control panel, thus enabling him to change or select the channel.

As described above, a digital/analog broadcast, especially a sub-channel broadcast comparatively soon fluctuates in actual situation owing to temporary suspension in transmission, for example. Therefore, even when channel information is stored as a channel map beforehand for selection of a channel based thereon, the channel selection may fail to display a, broadcast program on the display resultantly. Also, a deficiency of a signal in PSIP (Program System Information Protocol) may cause a failure in channel selection.

SUMMARY OF THE INVENTION

This invention is made to solve the above-mentioned problems and it is an object of the invention to provide such a channel selection device used in digital/analog broadcasting receivers and a digital/analog broadcasting receiver equipped with the same that is capable of automatically selecting an appropriate channel to avoid a situation of nothing being displayed on the display if a user who tried to change a channel he specified failed to select the channel because it had not been broadcast.

In accordance with an aspect of the present invention, the receiver receives a digital broadcasting signal which contains one or a plurality of sub-channels for originating contents for each main channel with the sub-channels being assigned a virtual channel relating to an analog broadcasting channel number. This permits a user accustomed to analog broadcasts to select his desired channels without feeling a sense of incompatibility.

When the device receives a channel changing instruction from the input device, it references a VCT of a desired channel, if its channel information is stored in the memory, to thereby select the channel if it is found and, if it is no found and failed in its selection, obtains the latest VCT to thereby select such a channel in the VCT that belongs to the same main channel and has the smallest sub-channel number or such a channel that has the smallest sub-channel number in the same physical channel. If no channel information of the desired channel is in the memory, on the other hand, the device shifts the frequency to search for a physical channel and, if its VCT can be obtained, references the VCT to select the channel as mentioned above and, otherwise, selects such a channel that has the smallest sub-channel number in the same physical channel.

Since the channels are thus selected, in channel selection on the basis of channel information stored in the memory, if a channel through which nothing is broadcast at the moment of the channel selection is selected, it is possible to avoid a situation that no program is displayed on the display owing to a failure in channel selection. Also, such a channel that has the smallest sub-channel number often involves digital broadcasting of the same contents as analog broadcasting in operation and is considered to have a high possibility of being selected by many viewers, so that the above-mentioned selection is considered to be valid.

In accordance with another feature of the invention, when the device receives a channel changing instruction, it selects a desired channel based on channel information stored in the memory and, if it failed, selects a predetermined sub-channel in the same main channel or a predetermined sub-channel in the same physical channel. With this, it is possible to automatically select a channel having appropriate broadcasting if channel selection failed.

DETAILED DESCRIPTION OF THE PREFERRED EMBODIMENT OF THE PRESENT INVENTION

Figure 1:
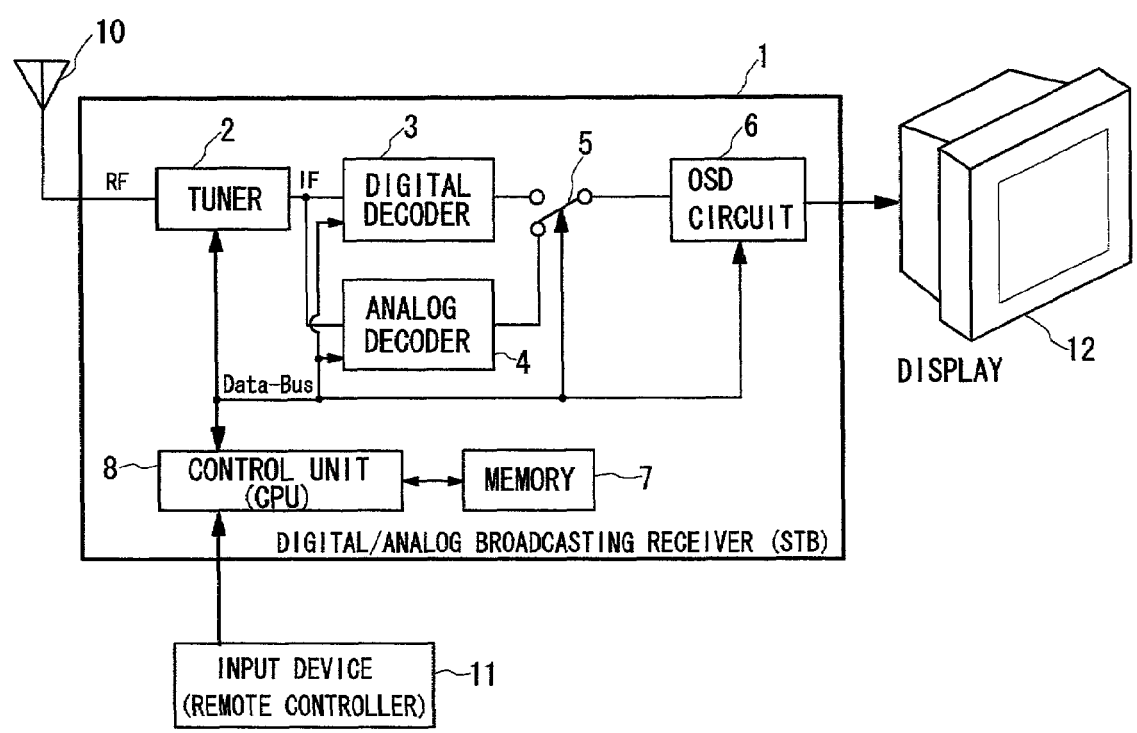
FIG. 1 is a block diagram for showing a digital/analog broadcasting receiver having a channel selection device according to one embodiment of the invention.

The following will describe a digital/analog broadcasting receiver having a channel selection device related to one embodiment of the invention with reference to the drawings. FIG. 1 is a block diagram of the digital/analog broadcasting receiver (hereinafter referred to as receiver). The receiver 1 is a set top box (STB) that receives at an antenna 10 an encoded radio-frequency (RF) digital/analog broadcasting signal originated from a TV broadcasting station to then display a list of the channel information which can be received by a display device 12 for displaying on a display a video signal contained in the broadcasting signal corresponding to operations for channel information display by the user by use of the body button or an input device 11 such as a later-described remote controller 30 shown in FIG. 2.

The receiver 1 comprises a tuner 2 for receiving a digital/analog broadcasting signal which is present in a frequency band corresponding to a desired channel, a digital decoder 3 and an analog decoder 4 for decoding the digital/analog broadcasting signal received at the tuner 2, a switch 5 for switching the broadcasting signals decoded by the digital decoder 3 and the analog decoder 4, an OSD circuit 6 for providing predetermined On-Screen Display (hereinafter abbreviated as OSD) at a display 12, a memory 7 for storing the originated frequencies of each digital broadcasting main channel and the channel configuration information, and a control unit 8 consisting of a CPU for controlling these sections of the receiver.

The tuner 2 is supplied with a digital/analog broadcasting signal received through the antenna 10 to then select a channel according to an instruction the user input to the control unit 8 from the input device 11 to thereby receive a digital/analog broadcasting signal of a frequency band corresponding to an input channel and modulate it into an intermediate frequency (IF) signal and then output it to the digital decoder 3 and the analog decoder 4. The digital decoder 3 and the analog decoder 4 decode the broadcasting signal received by the tuner 2. In the digital broadcasting channel configuration, each main channel is assigned each frequency band so that the sub-channels of the same main channel are used to originate broadcasting signals of the same frequency. However, the physical channels are different even in digital broadcasting using a virtual channel headed by the same number as that of analog broadcasting, so that if a user-selected channel through which the broadcasting signal is originated by a carrier wave of a different frequency band is of digital broadcasting (if the sub-channels are not of number "0"), the broadcasting signal is decoded by the digital decoder 3. If the user-selected channel is of analog broadcasting (if the sub-channels are of number "0"), the signal is decided by the analog decoder 4.

The switch 5 receives an instruction from the control unit 8 to then output to the OSD circuit 6 a broadcasting signal decided by either the digital decoder 3 or the analog decoder 4. The OSD circuit 6 in turn receives an instruction from the control unit 8 to then output the broadcasting signal to the display 12 and also output an OSD display signal for displaying a list of the receivable channel information. The memory 7 stores the information of each channel's frequency band and the channel configuration information as well as the information of OSD display at the time of shipment of the receiver.

The control unit 8 receives a user's input through the input device 11 to then control the sections through a data bus (Data-Bus) and cause the memory 7 to store the information of each channel's frequency band and the received channel information, thus referencing the information as occasion demands, for example, when a channel is selected.

Also, the control unit 8 receives a user's instruction for channel changing to then cause the tuner 2 to receive a broadcasting signal containing channel configuration information and then analyzes a VCT (Virtual Channel Table) given as the channel information obtained by decoding this broadcasting signal at the digital decoder 3, thus obtaining a status signal contained therein. This status signal generally contains all the digital/analog sub-channel information of a virtual channel. The control unit 8, therefore, can analyze that VCT to thereby obtain a virtual channel number consisting of the same number (main channel) as the previous channel number given to the same of the same system of broadcasting station originating the above-mentioned digital/analog broadcasting signal and a sub-channel number. That is, the control unit 8 can collectively obtain the digital/analog channel information originated from the same or the same system of broadcasting station. The control unit 8 stores thus obtained status signal in the memory 7, thus storing the channel information therein.

Figures 2, 3:
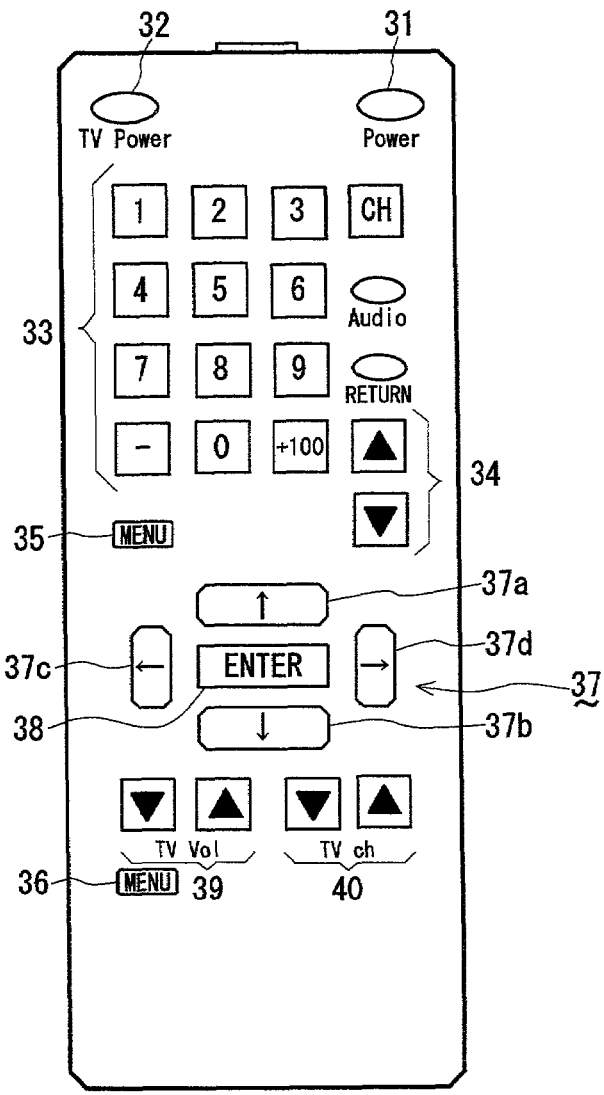
FIG. 2 is a plan view for showing a remote controller which constitutes part of the channel selection device.
FIG. 3 is a table showing a channel information display in the channel selection device.

Further, the control unit 8, when having received a user's instruction from the input device 11, references the data stored in the memory 7 to then indicate in OSD display such a later-described channel information table as shown in FIG. 3 at the display 12 and also moves a displayed cursor for channel selection to thereby display a video program of a selected broadcast.

The display 12 may be a display of a television receiver, a CRT, or a flat panel display such as an LCD (Liquid Crystal Display) or PDP (Plasma Display Panel). Although not shown, the receiver 1 is equipped with a D/A converter circuit for converting a digital signal into an analog one so that the signal for the OSD display or image display is converted by this D/A converter circuit into an analog signal and then output to the display 12. Also, the D/A converter circuit may be built in the display 12. Note here that to display contents on the flat panel display, the signal bypasses the D/A converter signal and is output as digital signal as it is.

The input device 11 is used to input a user's instruction to the control unit 8. The input device 11 may be a button provided on the front panel of the receiver 1 or a remote controller 30 such as shown in FIG. 2. In FIG. 2, the remote controller 30 is adapted to give an instruction in the form of an ultraviolet ray etc. to operate the receiver 1 and the television receiver, comprising power keys 31 and 32 for turning ON and OFF respectively the power of the receiver 1 and the television receiver, a numeric keypad 33 for inputting a channel number of the receiver 1, a channel UP/DOWN key pair 34 for changing the channel, menu keys 35 and 36 for calling a menu display of the receiver 1 and the television receiver respectively, keys 37 (37*a* to 37*d*) for moving the cursor in any desired directions, an entry (ENTER) key 38 for assuring an input, a sound-volume UP/DOWN key pair 39 for adjusting a sound volume of the television receiver, and a channel UP/DOWN key pair 40 for changing the television receiver channel.

Among the keys 37, the RIGHT/LEFT keys 37*c* and 37*d* are assigned for changing the main channel, while the UP/DOWN keys 37*a* and 37*b* are assigned for moving the cursor to thereby switch the sub-channel in each main channel. The assignment of the UP/DOWN keys 37*a* and 37*b* and the RIGHT/LEFT keys 37*c* and 37*d* may be reversed.

The following will describe an example of a hierarchical construction of a channel information table (channel map) held in the memory 7 of the receiver 1 with reference to FIG. 3. A list of this channel information can be given as an EPG (Electric Program Guide) in OSD display at the display 12 when the user gives an instruction to the control unit 8 using the menu key 35 on the remote controller 30. The channel information is comprised of the channel information of an analog broadcast ("1-0", "2-0", "3-0", . . .) and the channel information of a digital broadcast provided with a virtual channel headed by the same number as this analog broadcast's main channel number ("1-1", "1-2", "1-3", "2-1", "3-1", "3-2", . . .). In the list, the main channels are arranged sequentially in the horizontal direction and vertically are sequentially arranged the digital broadcasting virtual channels (in an ascending order) and analog broadcasting channels for each channel from the top. The shaded portions in the figure indicate the cursor.

Also, in changing the channel based on an instruction for main channel changing, if the main channel contains a plurality of sub-channels, the control unit 8 is to preferentially select the smallest channel number of sub-channel "1" of the digital sub-channels. In operation, sub-channel "0" involves an analog broadcast and sub-channel "1" involves a digital broadcast of the same contents in transmission, so that in viewing of a digital broadcast, sub-channel "1" is considered in concept to have comparatively a high channel selection desire from the viewers. If a main channel changing instruction goes out of a range shown in FIG. 3, the list is to be scrolled. In the case of a main channel not involving digital broadcasting, an analog channel is to be selected.

Figure 4:
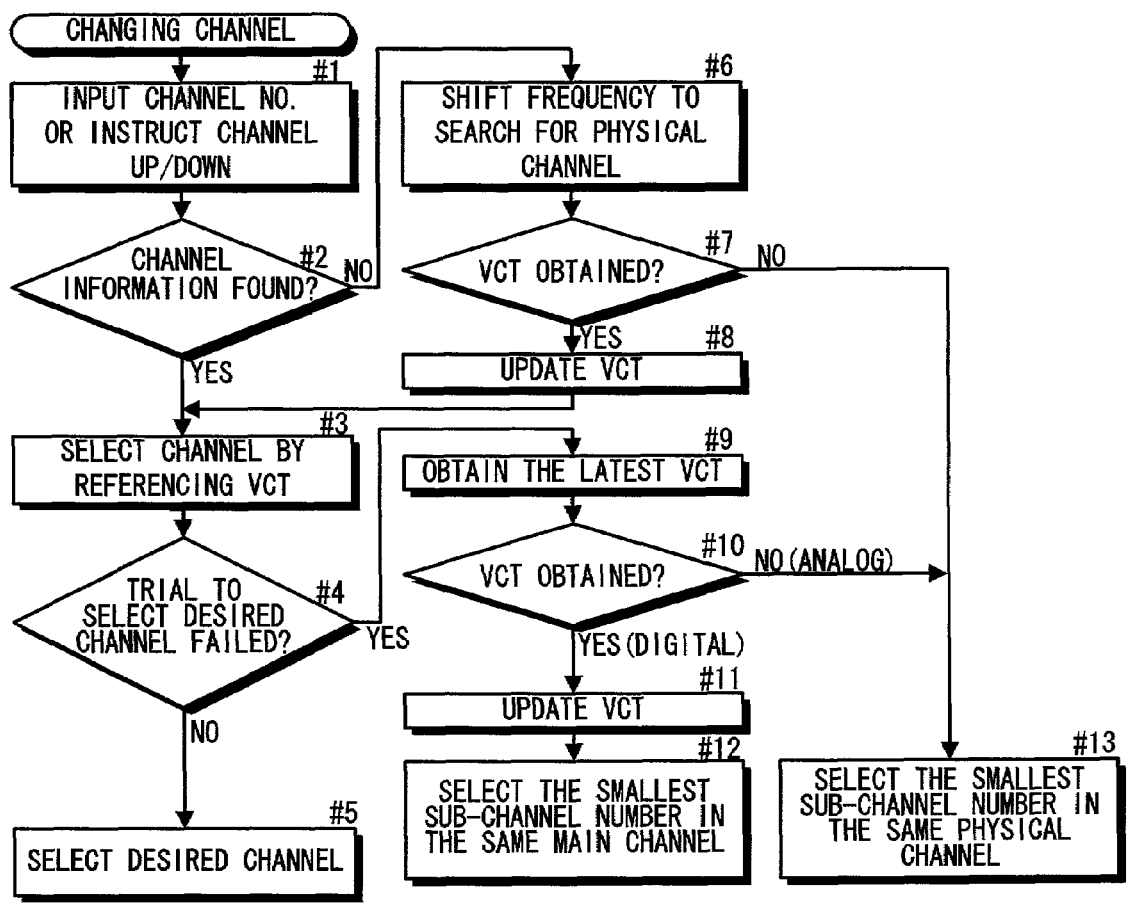
FIG. 4 is a flowchart for showing operations with the channel selection device.
Figure 5:
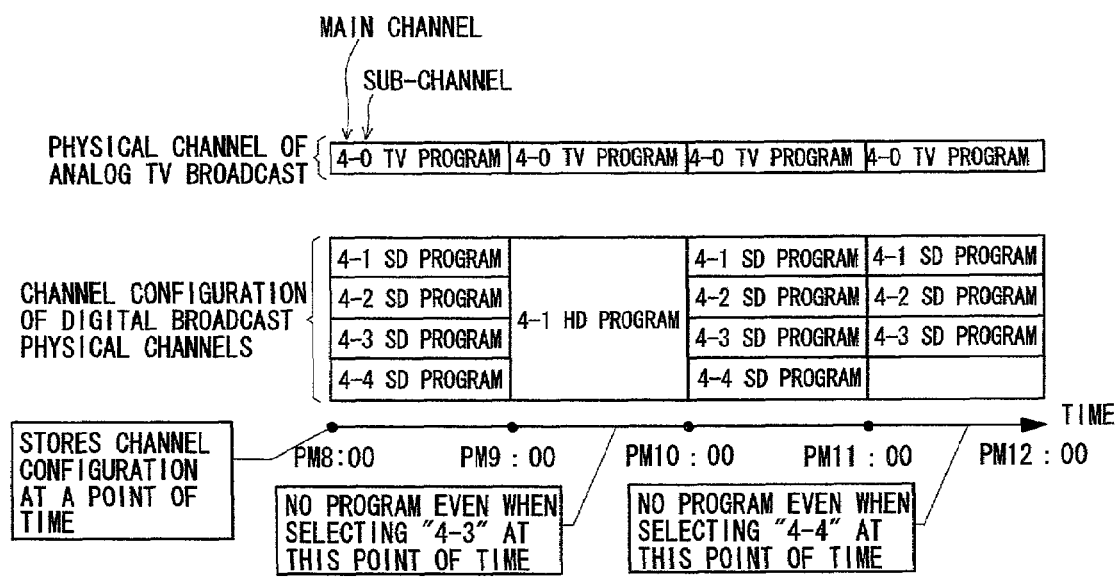
FIG. 5 is an illustration for showing a configuration of channels for digital broadcasts received by the digital/analog broadcasting receiver.

FIG. 4 shows a procedure for channel switch-over when a channel changing instruction is given from the remote controller 30 to the control unit 8. The channel changing instruction can be given by inputting a channel number or using the channel UP/DOWN keys 34 or the OSD-displayed cursor manipulation keys 37 (37*a* to 37*d*). When having received a changed channel number or a channel UP/DOWN operation instruction from the user (#1), the control unit 8 checks a channel related to the changing instruction (desired channel) for whether the its channel information is present in the memory 7 (#2) and, if it is present there, references its VCT to select the channel (#3) and, if the desired channel is found and not failed to be selected (NO is answered at #4), selects the desired channel (#5). If the desired channel is not found and failed to be selected (YES is answered at #4), the control unit 8 obtains the latest VCT (#9) and, if it is successful (YES is answered at #10), decides that the broadcasting is of digital transmission and updates the VCT (#11) to thereby select such a channel in the VCT that has the same main channel as that of the desired channel and that has the smallest sub-channel number (#12). If it failed to obtain the VCT at the above step (NO is answered at #10), the control unit 8 decides that the broadcasting is of analog transmission to thereby select such a channel that has the same physical channel as that of the desired channel and that has the smallest sub-channel number (#13).

If the channel information of the desired channel was not found in the memory 7 at the above step (NO is answered at #2), the control unit 8 shifts the frequency to search for a physical channel (#6) and, if it was successful (YES is answered at #7), updates the VCT (#8), so that the process skips to step #3 to select the channel while referencing the VCT as mentioned above. If the VCT was not obtained (NO is answered at #7), on the other hand, like the above, the control unit 8 selects a channel that has the smallest sub-channel number in the same physical channel as that of the desired channel (#13).

Specifically, for example, when an instruction is given to change channel "3-3" (of main channel number "3" and sub-channel number "3") in such a state that the VCT of the main channel 3 obtained in the preceding channel selection is held in the memory 7, the channel selection fails if the same sub-channel of a broadcast is not on the air currently, in which case the channel "3-1" of the smallest sub-channel number is selected automatically. If no digital broadcast is given, analog sub-channel "3-0" of a channel number 3 is selected.

In this embodiment, if a trial to select a channel according to a channel changing instruction failed, the device selects such a channel that has the smallest sub-channel number in the same main channel in the VCT or such a channel that has the smallest channel number in the same physical channel. Therefore, even if channel selection failed when a changing instruction is given to a channel broadcasting nothing therethrough currently owing to a change in the broadcast or when PSIP (Program System Information Protocol) is deficient, an appropriate channel can selected automatically, thus avoiding a state where nothing is displayed on the display. This selection is effective because such a channel that has the smallest sub-channel number has often a digital broadcast having the same contents as an analog broadcast and is considered to have a high possibility of being selected by many viewers. Also, a virtual channel is used in this embodiment, thus enabling the users accustomed to analog broadcasts to select desired channels without feeling a sense of incompatibility.

The invention is not limited to this embodiment but applicable to many variants; for example, the receiver 1 may be built in the body of a television receiver or a VCR (Video Cassette Recorder).

As mentioned above, by the invention, upon reception of a channel changing instruction, the device selects a desired channel by referencing its VCT if it can find its channel information and, if it cannot find it and failed in channel selection, obtains the VCT to thereby select such a channel in the VCT that has the smallest sub-channel number in the same main channel or such a channel that has the smallest sub-channel number in the same physical channel. Therefore, even if a channel to which the current channel is changed has no broadcast therethrough and so failed to be selected, such an appropriate channel is automatically selected that has a broadcast therethrough and also that is considered to have a high possibility of being selected, to thereby avoid a state that nothing is displayed on the display, thus preventing the user from feeling uncomfortable.

What is claimed is:

1. A channel selection device used in a digital/analog broadcasting receiver comprising:

a receiver for receiving an encoded digital/analog broadcasting signal originated from a broadcasting station;

a digital/analog decoder for decoding the digital/analog broadcasting signal received from the receiver and then outputting the signal to a display device for displaying an image;

a memory for storing, as a channel map, channel information contained in the broadcasting signal decoded by the digital decoder;

a control unit for controlling each section of the receiver; and an input device for inputting a user's instruction for channel selection to the control unit, wherein the device receives a digital broadcast and an analog broadcast which are originated through different physical channels, the digital broadcasting signal has one or a plurality of sub-channels for originating contents therethrough per one physical channel and also has a VCT (Virtual Channel Table) containing virtual channel information which provides the sub-channels with a correlation with an analog broadcasting physical channel, and the control unit controls the device such that the receiver receives the broadcasting signal of a selected channel upon reception of the channel selection instruction from the input device, and then the digital decoder decodes the received broadcasting signal, in order to obtain the channel information contained in the decoded broadcasting signal and then store the channel information in the memory, wherein when the control unit receives the channel changing instruction from the input device for a desired channel, and (I) when the control unit finds channel information for the desired channel in the memory, the control unit tries to select the channel by referencing the VCT stored in the memory due to a previous selection, by a user, of a main channel corresponding to a physical channel of the desired channel, and (a) when the desired channel was found, the control unit selects the desired channel, and (b) when the control unit could not find the desired channel because the channel is not currently being aired and failed in the channel selection, the control unit obtains the latest VCT from the digital broadcasting signal of the physical channel corresponding to the desired channel to thereby select such a channel in the VCT that has the smallest sub-channel number in the same main channel as the desired channel and such a channel that has the smallest sub-channel number in the same physical channel as the desired channel when the latest VCT could not be obtained and, (II) when the control unit could not find channel information for the desired channel in the memory, the control unit shifts a frequency to search for the physical channel and (a) references the VCT obtained from the digital broadcasting signal of the physical channel corresponding to the desired channel for channel selection when it could obtain the VCT and, (b) selects such a channel that has the smallest sub-channel number in the same physical channel as the desired channel when it could not obtain the VCT from the digital broadcasting signal of the physical channel corresponding to the desired channel.

2. The digital/analog broadcasting receiver equipped with the channel selection device according to claim 1, for receiving a digital broadcast according to the ATSC (Advanced Television Systems Committee) standard and an analog broadcast according to the NTSC (National Television Systems Committee) standard.

* * * * *